United States Patent Office 3,016,304
Patented Jan. 9, 1962

3,016,304
TREATMENT OF TEXTILES
Iris Winifred Preston and John Payne, Buckinghamshire, England, assignors to Monsanto Chemicals Limited, London, England, a British company
No Drawing. Filed Feb. 8, 1957, Ser. No. 638,929
Claims priority, application Great Britain Feb. 16, 1956
25 Claims. (Cl. 106—36)

This invention relates to the treatment of textiles with colloidal silica compositions and to compositions which are particularly suitable for such treatment.

Aqueous silica sols are widely used in the textile industry in order to assist in the spinning of textile fibres and to confer slip-proofing properties on textile yarns and fabrics: Such uses for silica sols are described in British Patents 607,696 and 626,847. The extent to which aqueous silica sols are used, for instance, in the spinning of woolen and worsted yarns in many countries of the world is an indication of the importance which is attached to the improvement in properties which colloidal silica confers on textile materials of various kinds. The improvements conferred are largely dependent upon increases in interfibre friction resulting from the deposition of silica. Various processes have been devised for obtaining aqueous colloidal solutions of silica suitable for treating textiles.

In using aqueous silica sols in the treatment of textiles it is sometimes desirable to apply them in conjunction with oils which confer other properties on the textile. For instance certain oils are normally used as assistants in the spinning of woolen and worsted yarns, and aqueous silica sols can be used in conjunction with them by forming an emulsion of the oil in the silica sol and using that. Such a use of emulsions of oil and silica sol is in fact now common. Moreover, although oils are not normally used in the spinning of cotton textiles, oil emulsions of aqueous silica sols can be used with benefit in the treatment of cotton fibres before spinning, as described in British Patent 654,858.

The formulation of these emulsions presents no difficulties, but it is inconvenient in that additional steps have to be taken which are not required when silica sols are used by themselves, and, in addition, the emulsions are not permanently stable, so that if they are allowed to stand for long periods before use, they break and re-emulsification is necessary. Moreover, the use of aqueous silica sols in treating textiles can result in a certain amount of corrosion of the machinery in which the textile material is handled, and the elimination of the possibility of corrosion due to the presence of the water would be a useful advance. Sometimes the nature of the textile treated causes difficulties when aqueous oil emulsions are applied: for example, difficulties arise in the application of aqueous oil emulsions to wool-viscose blends which are only resolved by treating the wool separately with the emulsion. To give another instance, the use of aqueous emulsions of some oils on slipe wools causes processing difficulties owing to interaction between the oil and water and the lime present, which results in the formation of sticky deposits of calcium soaps.

It has now been discovered that when finely divided silica is dispersed in oils to form fluid colloidal dispersions, it retains its ability to improve interfibre friction. This is surprising for the silica is necessarily in a state very different from that in which it exists in aqueous colloidal solution, and it could very well have been expected that this change in state would result in loss of its valuable properties. Indeed it has already been proposed to employ dispersions of silica in mineral oil as lubricating compositions, the function of which is in a sense the direct opposite of their use in improving interfibre friction. This discovery enables the disadvantages and difficulties mentioned above to be avoided.

The process of the invention is accordingly one for the improvement of the properties of a textile, in which it is treated with a fluid composition comprising silica colloidally dispersed in an oil as the dispersion medium.

The textiles treated are preferably unspun textile fibres, especially those of wool or wool blends and the fibres thus conditioned are spun into yarns of improved strength.

The compositions for treating the textiles can be obtained by mechanically dispersing a suitable finely-divided silica in an oil. The finely-divided silica will in practice have an ultimate particle size of from 10 to 100 millimicrons (diameter), and preferably from 15 to 50 millimicrons. The finely-divided silica can be obtained in a number of ways: it can for instance be prepared by the combustion of finely-divided silicon metal or tetraethyl orthosilicate in order to produce a silica smoke. Especially suitable is the silica prepared by converting a gaseous silicon compound to a silicon aerosol (for instance by combustion in air of hydrogen containing silicon tetrachloride or silicochloroform) and collecting the fine particles produced. Another way of preparing a suitable finely-divided silica is to remove the organic solvent from a silica organosol to obtain an aerogel, and then to pulverize the aerogel.

It is to be understood that by "oil" as used in this specification is meant a non-volatile water-immiscible pourable liquid of the type which can be used in the treatment of textiles. The oil employed may also be defined as a textile treating oil or a textile lubricating oil. Examples of such oils which can be used for the preparation of the colloidal dispersions of silica are those oils which are normally used in the textile industry to assist in spinning operations, for instance, mineral oils; vegetable oils, for example oleine, arachis oil, castor oil, olive oil, and other glycerides; sperm oil; and oil blends, for instance blends of sperm oil and castor oil, or oleine and mineral oil. Oleine and oleine-mineral oil blends are particularly suitable in woolen spinning, and sperm oil-castor oil blends and olive oil in worsted spinning.

When finely-divided silica is incorporated in an oil there is a tendency for it to thicken the oil to such an extent that if the silica content is comparatively high, the product is too thick to apply by spraying. Moreover there is a tendency for slow sedimentation of the silica to take place, and after a composition has stood for some time, it may be necessary to redisperse the silica. It has however also been discovered that these disadvantages can be avoided by incorporating in the compositions a dispersing agent which favours the formation of water-in-oil dispersions. It has been found that by incorporating a dispersing agent of this kind in the silica-oil dispersion, the viscosity of the composition can be much reduced, and moreover that sedimentation occurs much more slowly, and can even be negligible.

These compositions comprising a colloidal dispersion of silica in an oil as the dispersion medium and incorporatng a dispersing agent which favours the formation of water-in-oil dispersions, are new and are the compositions of the invention.

The dispersing agents are of course oil-soluble, and examples of suitable substances are lanolin (which is a mixture of cholesteryl palmitate, oleate and stearate), and di- and poly-ethylene glycol mono- and di-esters of long-chain alkyl carboxylic acids (the alkyl group may be unsaturated). Polyethylene glycol diesters of long-chain alkyl carboxylic acids are particularly suitable, and those derived from polyethylene glycols having a molecular weight within the range of from 150 to 900 (that is, from 3 to 20 ethenoxy groups) are especially valuable. Suitable esterifying groups are those derived from n-alkyl carboxylic acids having from 10 to 20 carbon atoms in the molecule, for instance, lauric, stearic, oleic and palmitic acids. Examples of diesters which have given excellent results are the dioleate of a polyethylene glycol of molecular weight 600 (that sold under the name "Nonex 69"), the distearate of a polyethylene glycol of molecular weight 400 (that sold under the name "Nonex 76") and the dilaurate of a polyethylene glycol of molecular weight 300 (that sold under the name "Nonex 102"). Propylene glycol and glyceryl esters of long-chain alkyl carboxylic acids, sorbitan-fatty acid condensates, especially the substance known as sorbitan sesquioleate (solid under the name "Crill S 16"), and ethylene oxide-fatty alcohol condensates can also be used.

Compositions containing these dispersing agents are readily obtained by dissolving the dispersing agent in the oil and then efficiently stirring in the finely-divided silica. By this means colloidal dispersions of silica in oil containing 6% or even 10% of silica by weight of oil can in many instances be readily obtained. When oleine is used care needs to be taken to ensure that the composition is not heated above 50° C., for instance by heat generated in stirring vigorously, otherwise the composition may gel. A 10% dispersion of finely-divided silica having an average particle size of about 30 millimicrons in oleine containing 2% of lanolin by weight of the oil is not much thicker than oleine itself and its stabilty is very satisfactory. From 1.5 to 10% of dispersing agent by weight of the oil is usually suitable: the amount most suitable in any given instance will depend on the constituents of the composition being prepared and the precise method of mixing used.

In using the compositions for the treatment of textiles, they can be applied in the same way as aqueous silica sol-oil emulsions are used in the textile industry. The compocitions can be sprayed on to the textiles if they are not too viscous, or they can be taken up by a roller dipping into a bath of composition and brushed off the top of the roller in the form of spray which is directed on to the textiles. When the compositions are applied to unspun fibers which are then converted into yarn, they can be applied at any stage in the spinning process before the yarn is formed: for example they can be applied at the opening stage or after carding. The amount of composition used, and its content of silica will depend to some extent on the result which is desired, but it will usually be undesirable simply to increase the total amount of oil applied to a textile in order to provide sufficient silica. It is convenient to choose the amount of oil to be applied to a given quantity of textile, to find how much silica is required to give the desired properties to the textile, and to calculate accordingly what silica content the silica-oil dispersion should have. Where the composition is to be applied to the spinning of fibers, for instance wool fibers, it is usually satisfactory to apply from 3 to 7% of oil by weight of the wool (or other textile) and from 0.1 to 0.5% of finely-divided silica in order to provide the improvement in interfibre friction desired. A colloidal dispersion of silica in oil containing from 5 to 20% of silica by weight of oil, and conveniently about 6% by weight of silica, can be used in such an instance.

The process and compositions of the invention can be applied in the spinning of many textiles where silica sols give an improvement in their properties or assist processing, and they are particularly suitable for use in the spinning of wool and wool blends by the woolen system of spinning. Examples of suitable wool blends are blends of wool with Terylene, nylon, viscose rayon, and Ardil respectively.

The invention is illustrated by the following examples.

*Example 1*

A finely-divided solid silica aerogel prepared by the removal of organic solvent from a silica organosol and having an ultimate particle size of about 30 millimicrons (the substance sold under the name "Santocel 54") was used as follows. The silica powder (10 g.) was stirred thoroughly into oleine (100 g.) until dispersion was complete. The product was viscous but it could be sprayed under pressure.

The composition was applied manually and as evenly as possible to wool fibers and the increase in interfibre friction was measured using the method and apparatus described in Textile Research J., 1953, 23, 495. This was done by determining the number of twists or turns required to be given to two treated fibres in order to prevent them moving relative to one another under the application of a standard force. The reciprocal of the number of turns required is proportional to the interfibre friction, and may be designated as $K\mu$. The results were compared with the use of oleine alone and of a 10% aqueous silica sol-oleine emulsion. The results were as follows:

|  | Number of turns | $K\mu$ |
| --- | --- | --- |
| Oleine | 18 | 0.056 |
| Aqueous silica sol-oil emulsion | 15 | 0.067 |
| Silica dispersion in oil | 14 | 0.071 |

*Example 2*

A composition was prepared by stirring 10 grams of a finely-divided silica of the type prepared by converting a gaseous silicon compound to a silica aerosol and collecting the fine particles produced, and having an ultimate particle size of 15 to 20 millimicrons (one of the substances sold under the name "Aerosil") in 100 g. of oleine. The product was a viscous fluid composition.

The composition was tested in the same way as in Example 1, using identical conditions. The number of turns required was only 11, giving $K\mu=0.091$.

*Example 3*

A composition was obtained using the following materials:

| | G. |
| --- | --- |
| Oleine | 100 |
| Silica powder (Santocel 54) | 10 |
| Lanolin | 2 |

The lanolin was dissolved in the oil, and the silica then stirred in. The composition obtained was a comparatively fluid substance having excellent stability.

The product was tested in exactly the same way as before, and the number of turns required was found to be 12, $K\mu=0.083$.

*Example 4*

A composition was prepared using the following materials:

| | G. |
| --- | --- |
| Oleine | 100 |
| Silica powder (Aerosil) | 10 |
| Lanolin | 2 |

The substances were mixed together as before, and a fluid stable composition was obtained. When used in the test under conditions identical with those previously employed, the number of turns required to prevent relative movement of the fibres was 13, $K\mu=0.077$.

*Example 5*

A satisfactory fluid composition was prepared using the following materials:

| | G. |
| --- | --- |
| Oleine | 100 |
| Silica (Santocel 54) | 10 |
| Dioleate of a polyethylene glycol of mol. wt. 600 (Nonex 69) | 2 |

Similar fluid compositions were prepared in which the dispersing agent Nonex 69 was replaced by an equal quantity of the distearate of a polyethylene glycol of mol. wt. 400 (Nonex 76) or the dilaurate of a polyethylene glycol of mol. wt. 300 (Nonex 102).

*Example 6*

A fluid composition was prepared from the following:

| | G. |
|---|---|
| Oleine | 100 |
| Silica (Aerosil S) | 10 |
| Dioleate of a polyethylene glycol of mol. wt. 600 (Nonex 69) | 2 |

A similar composition prepared on a larger scale from oleine (1000 g.); Aerosil S. (60 g.) and Nonex 69 (20 g.) was an optically clear fluid.

*Example 7*

A fluid composition was prepared from the following materials:

| | G. |
|---|---|
| Oleine | 100 |
| Silica (Santocel 54) | 10 |
| Sorbitan sesquioleate (Crill S 16) | 2 |

*Example 8*

A fluid composition was prepared from the following:

| | G. |
|---|---|
| Olive oil | 100 |
| Silica (Aerosil S) | 10 |
| Dioleate of a polyethylene glycol of mol. wt. 600 (Nonex 69) | 2 |

*Example 9*

A composition based on a mineral oil was prepared from the following ingredients:

| | G. |
|---|---|
| A commercial mineral wool oil | 100 |
| Silica (Santocel 54) | 10 |
| Dioleate of a polyethylene glycol of mol. wt. 600 (Nonex 69) | 2 |

A similar composition prepared using the same quantity of the silica Aerosil S gave an optically clear fluid.

*Example 10*

This example describes compositions based on a blended oil and their use in the treatment of wool. The blended oil employed was a commercial oleine-mineral oil blend containing 60% by weight of oleine.

Two compositions were prepared from the following ingredients in parts by weight:

| | A | B |
|---|---|---|
| Blended oil | 100 | 100 |
| Silica (Aerosil S) | 10 | 6.5 |
| Lanolin | 2 | 2 |

The lanolin was first dissolved in the oil, and the silica was then added slowly with efficient stirring.

One 25 lb. lot of a 60s scoured Australian wool of 1"–2" staple length fibre was treated evenly with 7% of blended oil by weight of wool, using an oiling can. A second and third lot of similar wool were treated in the same way but with sufficient of compositions A and B respectively to give 7% by weight of oil on the wool.

Each lot of wool was then processed on conventional woolen spinning machinery. The roving of about 12 counts Yorkshire woolen skeins (that is weighing 62 g. per km.) obtained in the process was spun into 16s count yarn (121 g. per km.) with a twist of 12 turns per inch on a mule having 138 spindles. Hanks measuring 36 yards of yarn, consisting of 25 turns were wound from 21 bobbins of each lot and the strength of the yarn tested by breaking on a Baldwin testing machine at constant rate of loading. The count was calculated from the weight of each hank and the product of count multiplied by strength was determined for each hank. The mean of 21 readings was taken. The amount of silica deposited on the yarn was also determined by analysis (from the residue after combustion).

| Treating composition | Count (Y.W.S.) | Silica on Yarn, percent | Count strength | Strength increase, percent |
|---|---|---|---|---|
| Oil | 15.4 | 0 | 648±31 | |
| A | 16.1 | 0.4 | 792±54 | 22 |
| B | 15.8 | 0.3 | 776±40 | 20 |

*Example 11*

This illustrates another composition based on a blended oil, this oil consisting of 70 parts by weight of oleine and 30 parts of mineral oil. The composition was prepared from the following ingredients:

| | G. |
|---|---|
| Blended oil | 100 |
| Silica (Aerosil S) | 10 |
| Dioleate of a polyethylene glycol of mol. wt. 600 (Nonex 69) | 2 |

What we claim is:

1. A fluid composition consisting essentially of a colloidal dispersion of from 5 to 20% by weight of silica having an ultimate particle size of 10 to 100 millimicrons in a textile lubricating oil as the dispersion medium having dissolved therein from 1.5 to 10% by weight of a dispersing agent which is soluble in said oil and is selected from the group consisting of (1) lanolin, (2) diethylene glycol mono-esters of long-chain alkyl carboxylic acids, (3) diethylene glycol di-esters of long-chain alkyl carboxylic acids, (4) polyethylene glycol mono-esters of long-chain alkyl carboxylic acids, (5) polyethylene glycol di-esters of long-chain alkyl carboxylic acids, (6) propylene glycol esters of long-chain alkyl carboxylic acids, (7) glyceryl esters of long-chain alkyl carboxylic acids, (8) sorbitan-fatty acid condensates, and (9) ethylene oxide-fatty alcohol condensates, said dispersing agent having the additional properties of favoring the formation of water-in-oil dispersions and of reducing the viscosity of said composition.

2. A fluid composition as in claim 1 in which said textile lubricating oil is a mineral oil.

3. A fluid composition as in claim 1 in which said textile lubricating oil is a vegetable oil.

4. A fluid composition as in claim 3 in which said vegetable oil is oleine.

5. A fluid composition as in claim 1 in which said textile lubricating oil is an oil selected from the group consisting of olive oil and blends of sperm oil and castor oil.

6. A fluid composition as in claim 1 in which said textile lubricating oil is a blend of oleine and mineral oil.

7. A process for the conditioning of unspun textile fibers to improve their interfibre friction which comprises applying to said fibers, at some stage of their processing prior to spinning, a fluid composition consisting essentially of a colloidal dispersion of from 5 to 20% by weight of silica having an ultimate particle size of 10 to 100 millimicrons in a textile lubricating oil as the dispersion medium having dissolved therein from 1.5 to 10% by weight of a dispersing agent which is soluble in said oil and is selected from the group consisting of (1) lanolin, (2) diethylene glycol mono-esters of long-chain alkyl carboxylic acids, (3) diethylene glycol di-esters of long-chain alkyl carboxylic acids, (4) polyethylene glycol mono-esters of long-chain alkyl carboxylic acids, (5) polyethylene glycol di-esters of long-chain alkyl carboxylic acids, (6) propylene glycol esters of long-chain alkyl carboxylic acids, (7) glyceryl esters of long-chain alkyl carboxylic acids, (8) sorbitan-fatty acid condensates, and (9) ethylene oxide-fatty alcohol condensates, said dispersing agent having the additional properties of favoring the formation of water-in-oil dispersions and of reducing the viscosity of said composition, said composition being applied in an amount sufficient to deposit from 0.1 to 0.5% of silica on the weight of the fibers.

8. A process as in claim 7 in which said fibers are unspun wool fibers and said composition is applied thereto in an amount sufficient to provide from 3 to 7% of said oil and from 0.1 to 0.5% of silica on the weight of the fibres.

9. A wool fiber containing textile conditioned with a fluid composition consisting essentially of 5 to 20% by weight of silica having an ultimate particle size of 10 to 100 millimicrons colloidally dispersed in a textile lubricating oil as the dispersion medium and from 1.5 to 10% by weight of a dispersing agent which is soluble in said oil and is dissolved therein, said dispersing agent having the additional properties of favoring the formation of water-in-oil dispersions and of reducing the viscosity of said composition.

10. A substance selected from the group consisting of woolen and worsted yarns composed of wool fibers and conditioned with a fluid composition consisting essentially of silica having an ultimate particle size of 10 to 100 millimicrons colloidally dispersed in a wool lubricating and spinning oil as the dispersion medium and from 1.5 to 10% by weight of a dispersing agent which is soluble in and dissolved in said oil and is selected from the group consisting of (1) lanolin, (2) diethylene glycol mono-esters of long-chain alkyl carboxylic acids, (3) diethylene glycol di-esters of long-chain alkyl carboxylic acids, (4) polyethylene glycol mono-esters of long-chain alkyl carboxylic acids, (5) polyethylene glycol di-esters of long-chain alkyl carboxylic acids, (6) propylene glycol esters of long-chain alkyl carboxylic acids, (7) glyceryl esters of long-chain alkyl carboxylic acids, (8) sorbitan-fatty acid condensates, and (9) ethylene oxide-fatty alcohol condensates, said dispersing agent having the additional properties of favoring the formation of water-in-oil dispersions and of reducing the viscosity of said composition, said composition being present in such amounts and containing silica and oil in such proportions that the yarns contain from 3 to 7% of said oil and 0.1 to 0.5% of silica, both percentages being based on the weight of the yarn.

11. A fluid composition as in claim 1, but further characterized in that the dispersing agent is lanolin.

12. A fluid composition as in claim 1, but further characterized in that the dispersing agent is a polyethylene glycol diester of a long-chain alkyl carboxylic acid.

13. A fluid composition as in claim 12, but further characterized in that the polyethylene glycol diester dispersing agent is one derived from a polyethylene glycol having a molecular weight within the range of from 150 to 900 and an n-alkyl carboxylic acid having from 10 to 20 carbon atoms in the molecule.

14. A fluid composition as in claim 12, but further characterized in that the dispersing agent is selected from the group consisting of a dioleate of a polyethylene glycol having a molecular weight of 600, a distearate of a polyethylene glycol having a molecular weight of 400 and a dilaurate of a polyethylene glycol having a molecular weight of 300.

15. A fluid composition as in claim 1, but further characterized in that the dispersing agent is sorbitan sesquioleate.

16. A process as in claim 7, but further characterized in that said oil is oleine.

17. A process as in claim 7, but further characterized in that said oil is a blend of oleine and mineral oil.

18. A process as in claim 7, but further characterized in that said oil is selected from the group consisting of olive oil and blends of sperm oil and castor oil.

19. A process as in claim 7, but further characterized in that said dispersing agent is lanolin.

20. A process as in claim 7, but further characterized in that said dispersing agent is a polyethylene glycol diester of a long chain alkyl carboxylic acid.

21. A process as in claim 20, but further characterized in that said dispersing agent is one derived from a polyethylene glycol having a molecular weight within the range of from 150 to 900 and an n-alkyl carboxylic acid having from 10 to 20 carbon atoms in the molecule.

22. A process as in claim 20, but further characterized in that the dispersing agent is selected from the group consisting of a dioleate of a polyethylene glycol having a molecular weight of 600, a distearate of a polyethylene glycol having a molecular weight of 400 and a dilaurate of a polyethylene glycol having a molecular weight of 300.

23. A process as in claim 7, but further characterized in that said dispersing agent is sorbitan sesquioleate.

24. A process for conditioning a textile containing textile fibers to improve the interfibre friction of said fibers which comprises treating said textile with a fluid composition consisting essentially of a colloidal dispersion of from 5 to 20% by weight of silica having an ultimate particle size of 10 to 100 millimicrons in a textile lubricating oil as the dispersion medium and having dissolved in said oil from 1.5 to 10% by weight of a dispersing agent which is soluble in said oil and has the additional properties of favoring the formation of water-in-oil dispersions and of reducing the viscosity of said composition.

25. A fluid composition consisting essentially of a colloidal dispersion of from 5 to 20% by weight of silica having an ultimate particle size of 10 to 100 millimicrons in a textile lubricating oil as the dispersion medium having dissolved therein from 1.5 to 10% by weight of a dispersing agent which is soluble in said oil and has the additional properties of favoring the formation of water-in-oil dispersions and of reducing the viscosity of said composition.

References Cited in the file of this patent

UNITED STATES PATENTS

| | | |
|---|---|---|
| 2,067,174 | Dickie | Jan. 12, 1937 |
| 3,438,328 | Speakman et al. | Mar. 23, 1948 |
| 2,590,659 | Skalkeas | Mar. 25, 1952 |
| 2,682,486 | Humphreys | June 29, 1954 |
| 2,787,966 | Lyons | Apr. 9, 1957 |

OTHER REFERENCES

Schwartz-Perry: "Surface Active Agents," pub. 1949 by Interscience Publishers, N.Y.C. (pages 214, 230, 231).